United States Patent
Zhang

(10) Patent No.: US 6,961,500 B2
(45) Date of Patent: Nov. 1, 2005

(54) DISPERSION AND SLOPE COMPENSATING OPTICAL FIBER AND TRANSMISSION LINK INCLUDING SAME

(75) Inventor: Lu Zhang, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 18 days.

(21) Appl. No.: 10/873,603

(22) Filed: Jun. 22, 2004

(65) Prior Publication Data

US 2004/0234220 A1 Nov. 25, 2004

Related U.S. Application Data

(62) Division of application No. 10/184,377, filed on Jun. 28, 2002, now Pat. No. 6,768,852.
(60) Provisional application No. 60/304,662, filed on Jul. 11, 2001.

(51) Int. Cl.$^7$ .............................................. G02B 6/22
(52) U.S. Cl. ........................................ 385/123; 385/127
(58) Field of Search .......................... 385/123–128

(56) References Cited

U.S. PATENT DOCUMENTS

| | | | |
|---|---|---|---|
| 5,361,319 A | 11/1994 | Antos et al. | 385/123 |
| 5,555,340 A | 9/1996 | Onishi et al. | 385/127 |
| 5,568,583 A | 10/1996 | Akasaka et al. | 385/123 |
| 5,742,723 A | 4/1998 | Onishi et al. | 385/127 |
| 5,999,679 A | 12/1999 | Antos et al. | 385/127 |
| 2002/0097969 A1 | 7/2002 | Aikawa et al. | 385/123 |
| 2002/0154877 A1 | 10/2002 | Li et al. | 385/127 |
| 2002/0164139 A1 * | 11/2002 | Saitou et al. | 385/127 |

FOREIGN PATENT DOCUMENTS

| | | | |
|---|---|---|---|
| EP | 1072909 A2 | 1/2001 | |
| EP | 1107028 A1 | 6/2001 | |
| FR | WO 01/01177 | 1/2001 | G02B/6/16 |
| JP | 11-331911 | 11/1998 | G02B/6/22 |
| JP | WO 00/17684 | 3/2000 | G02B/6/16 |
| US | WO 00/67053 | 11/2000 | G02B/6/16 |
| US | WO 01/25828 | 4/2001 | G02B/6/00 |

OTHER PUBLICATIONS

Corning SMF–28 Optical Fiber Product Information, Issued Apr. 2, 2001, Corning Incorporated.
"Dispersion Compensating Fibers" Gruner–Nielsen, et al Optical Fiber Technology 6, 164–180(2000).
"Broadband dispersion–compensating fiber for high–bit–rate transmission network use" Semenov, et al Applied Optics pp. 5331–5337, Aug. 20, 1995, vol. 34, No. 24.

* cited by examiner

Primary Examiner—Juliana Kang
(74) Attorney, Agent, or Firm—Randall S. Wayland

(57) ABSTRACT

A DCF adapted to compensate for dispersion and slope of a length of SMF in the C-band window that includes a core surrounded by a cladding layer of refractive index $\Delta_c$. The core includes at least three radially adjacent segments, a central core segment having a positive $\Delta 1$, a moat segment having a negative refractive index $\Delta 2$, and a ring segment having a positive refractive index $\Delta 3$, wherein $\Delta 1 > \Delta 3 > \Delta_c > \Delta 2$. The DCF exhibits a negative Dispersion Slope (DS), where $-0.29$ (ps/nm$^2$·km) at 1546 nm, a dispersion (D), where $-100 < D < -120$ (ps·nm·km) at 1546 nm, and a $\kappa$ value (D/DS) at 1546 nm that is preferably between 250 and 387 nm. The DCF preferably has a cutoff wavelength ($\lambda c$) less than 1500 nm, attenuation at 1550 nm of less than 0.6 dB/km, and a bend loss of less than 0.01 dB/m on a 40 mm mandrel at 1550 nm. A transmission link including the combination of a SMF and a DCF having a dispersion (D), where $-100 < D < -120$, is also disclosed.

10 Claims, 3 Drawing Sheets

DISPERSION AND SLOPE COMPENSATING OPTICAL FIBER AND TRANSMISSION LINK INCLUDING SAME

This is a divisional of U.S. patent application Ser. No. 10/184,377 filed on Jun. 28, 2002 now U.S. Pat. No. 6,768,852, the content of which is relied upon and incorporated herein by reference in its entirety, and the benefit of priority under 35 U.S.C. §120 is hereby claimed, which further claims the benefit of and priority to U.S. Provisional Application No. 60/304,662, filed Jul. 11, 2001, the content of which is hereby incorporated by reference herein.

BACKGROUND OF THE INVENTION

1. Field of the Invention

The present invention relates to dispersion and slope compensating optical fibers and transmission links for wavelength division multiplexing (WDM) systems, and more particularly to optical fibers and transmission links including such fibers that are particularly well suited for compensating dispersion and slope of Single Mode Fiber (SMF) operating in the C-band.

2. Technical Background

To meet the ongoing drive for more bandwidth at lower costs, telecommunications system designers are turning to high channel count dense wavelength division multiplexing (DWDM) architectures, longer reach systems and higher transmission bit rates. This evolution makes chromatic dispersion management critical to system performance, as system designers now desire the ability to accurately compensate dispersion across entire channel plans. Today, the only viable broadband commercial technology to battle dispersion has been Dispersion Compensating Modules (DCMs), i.e., spools having a suitable length of Dispersion Compensating Fiber (DCF) wound thereon. As DWDM deployments increase to 16, 32, 40 and more channels, broadband dispersion compensating products are even more desirable. Many current telecommunications systems have SMFs that, although they are optimized for zero dispersion at about 1310 nm, can also be utilized effectively to transmit signals at wavelengths around 1550 nm. This enables erbium-doped fiber amplifiers to be employed. An example of such a SMF is SMF-28™ manufactured by Corning Incorporated. Prior Art FIG. 2 illustrates the refractive index profile for such a SMF. Typically, such fibers exhibit a dispersion of about 17 ps/(nm·km) and a dispersion slope of about 0.058 ps/(nm²·km) at 1550 nm.

With continuing interest in higher bit rate systems (>10 Gbs), long reach systems (e.g., >500 km) and optical networking, it is imperative to use DCFs in networks that carry data on SMF as well. High bit rates, longer reaches and wider bandwidths require dispersion, but also dispersion slope to be compensated for more exactly.

Consequently, it is desirable for the DCF to have dispersion characteristics such that its dispersion and dispersion slope are matched to that of the SMF transmission fiber it is required to compensate. The ratio of dispersion to dispersion slope at a given wavelength is referred to as "kappa (κ)." Kappa changes as a function of wavelength for a given transmission fiber. Hence, it is equally important that the kappa value of the DCF is matched to that of the transmission fiber in the operating window.

It would be desirable to develop alternative DCFs, in particular, ones having the ability to compensate for dispersion of SMF over a wide wavelength band around 1550 nm.

SUMMARY OF THE INVENTION

The present invention is a dispersion compensating optical fiber which comprises a core refractive index profile which is selected to result in a fiber which exhibits negative dispersion and negative dispersion slope at 1546 nm and preferably exhibits low bend loss and low attenuation. The DCF in accordance with the present invention is particularly effective at compensating for both the dispersion and slope of a SMF in a transmission link operating within the C-band operating window. More particularly, the present invention is a DCF comprising a core refractive index profile with a central core segment having a positive relative refractive index $\Delta 1$, a moat segment surrounding the central core segment having negative relative refractive index $\Delta 2$, and a ring segment which surrounds the moat segment having a positive relative refractive index $\Delta 3$, wherein $\Delta 1 > \Delta 3 > \Delta 2$, And where $\Delta$ is defined as:

$$\Delta = \frac{(n_1^2 - n_c^2)}{2n_1^2} \times 100.$$

The DCF in accordance with a first embodiment of the invention exhibits a core refractive index profile that results in a negative dispersion slope of less than −0.29 ps/(nm²·km) at a wavelength of 1546 nm, a negative dispersion of between −100 ps/(nm·km) and −120 ps/(nm·km) at a wavelength of 1546 nm, and a kappa value obtained by dividing the dispersion by the dispersion slope at 1546 nm in the range between of 250 to 387 nm. The DCF preferably has a cladding layer surrounding the ring segment and having a relative refractive index $\Delta c$, wherein $\Delta 1 > \Delta 3 > \Delta c > \Delta 2$.

The DCF in accordance with another embodiment of the invention exhibits a core refractive index profile that results in a negative dispersion slope of less than −0.29 ps/(nm²·km) and greater than −0.40 ps/(nm²·km) at a wavelength of 1546 nm, and more preferably less than −0.36 and greater than −0.40 ps/(nm²·km) at 1546 nm. In accordance with the invention, the DCF also exhibits a negative dispersion of between −100 ps/(nm·km) and −120 ps/(nm·km) at a wavelength of 1546 nm, and more preferably between −105 ps/(nm·km) and −120 ps/(nm·km) at 1546 nm. The DCF in accordance with the invention preferably exhibits a kappa value obtained by dividing the dispersion by the dispersion slope at 1546 nm in the range between of 250 to 387 nm. The DCF preferably has a cladding layer surrounding the ring segment and having a relative refractive index $\Delta c$, wherein $\Delta 1 > \Delta 3 > \Delta c > \Delta 2$.

Advantageously, the cutoff wavelength $(\lambda_c)$ of the DCF is less than 1500 nm and more preferably less than 1350 nm. Low cutoff wavelength in a DCF is advantageous because it provides a system that may only propagate light in the fundamental mode. Thus, Multiple Path Interference (MPI) may be significantly reduces which, therefore, reduces system noise in the C-band wavelength window.

In accordance with another embodiment of the DCF of the present invention, the peak delta $\Delta 1$ of the central core segment is greater than 1.6% and less than 2.0%, and more preferably greater than 1.7% and less than 1.9%. The lowest delta $\Delta 2$ of the moat segment is less than −0.25% and greater than −0.44%, and is more preferably less than −0.30% and greater than −0.37%. The peak delta $\Delta 3$ of the ring segment is greater than 0.2% and less than 0.5%, and more preferably greater than 0.35% and less than 0.45%.

In accordance with another embodiment of the invention, the dispersion compensating optical fiber has an outer radius $r_1$ of the central core segment between 1.5 and 2 microns; an outer radius $r_2$ of the moat segment between 4 and 5 microns; and a center radius $r_3$ of the ring segment between 5.5 and 7 microns. More preferably, the outer radius $r_1$ of the central core segment is between 1.6 and 1.8 microns; the outer radius $r_2$ of the moat segment is between 4.2 and 4.8 microns; and the center radius $r_3$ of the ring segment is between 6 and 6.5 microns.

According to another embodiment of the invention, the dispersion compensating optical fiber has a core/moat ratio, taken as r1/r2, that is greater than 0.34 and less than 0.40 and an effective area (Aeff) at 1546 nm that is greater than 18 square microns, and more preferably greater than 20 square microns. This large effective area is desirable as it can reduce non-linear effects. The DCF preferably exhibits an attenuation of less than 0.6 dB/km at 1550 nm thereby not appreciably adding to the total attenuation of the transmission link. Additionally, the DCF preferably exhibits a bend loss that is less than 0.01 dB/m, and more preferably less than 0.005 dB/m at 1550 nm on a 40 mm diameter mandrel. Low bend loss is very important in DCF's as it allows for compact packaging on the modules and helps to keep the total link attenuation low.

In accordance with a preferred embodiment of the invention, the DCF includes a ring segment having a lower delta tail portion that meets the zero delta % at a radius greater than 8 microns, more preferably greater than 10 microns, and most preferably greater than 12 microns. The tail portion 40 preferably has a delta % of greater than 0.02% and less than 0.2% at a radius between 7 and 8 microns. Preferably, the tail portion tapers linearly from about 8 microns to the zero delta % 42.

In another embodiment of the invention, an optical fiber transmission link is provided comprising a length of SMF optimized for low dispersion operation at a wavelength range of 1290 nm to 1320 nm; and a length of DCF having a dispersion value between −100 and −120 at 1546 nm wherein within a transmission band of between 1520 nm to 1570 nm the transmission link exhibits an absolute value of residual dispersion less than about 0.15 ps/km/nm. Preferably, the length of SMF is greater than 6 times, and more preferably greater than 7 times, the length of the length of DCF.

Additional features and advantages of the invention will be set forth in the detailed description which follows, and will be readily apparent to those skilled in the art from that description or recognized by practicing the invention as described herein, including the detailed description which follows, the claims, as well as the appended drawings.

It is to be understood that both the foregoing general description and the following detailed description are merely exemplary of the invention, and are intended to provide an overview or framework for understanding the nature and character of the invention as it is claimed. The accompanying drawings are included to provide a further understanding of the invention, and are incorporated in and constitute a part of this specification. The drawings illustrate various embodiments of the invention, and together with the description serve to explain the principles and operation of the invention.

DETAILED DESCRIPTION OF THE INVENTION

Figure 1:
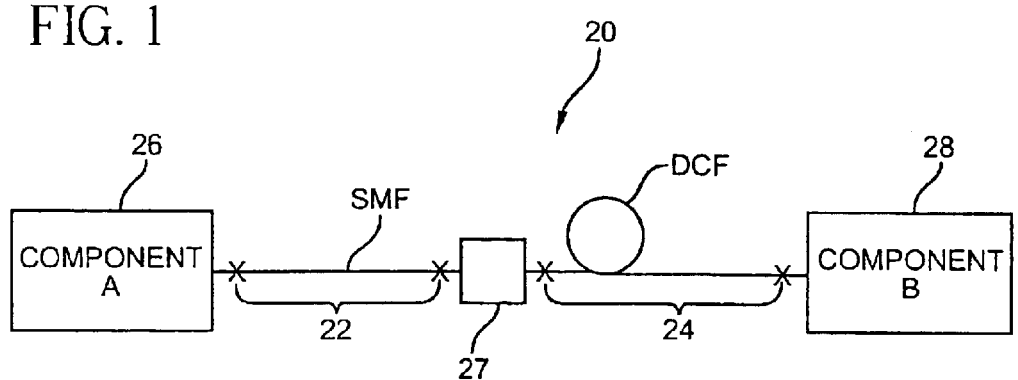
FIG. 1 illustrates a transmission link including the DCF in accordance with the invention.
Figure 2:
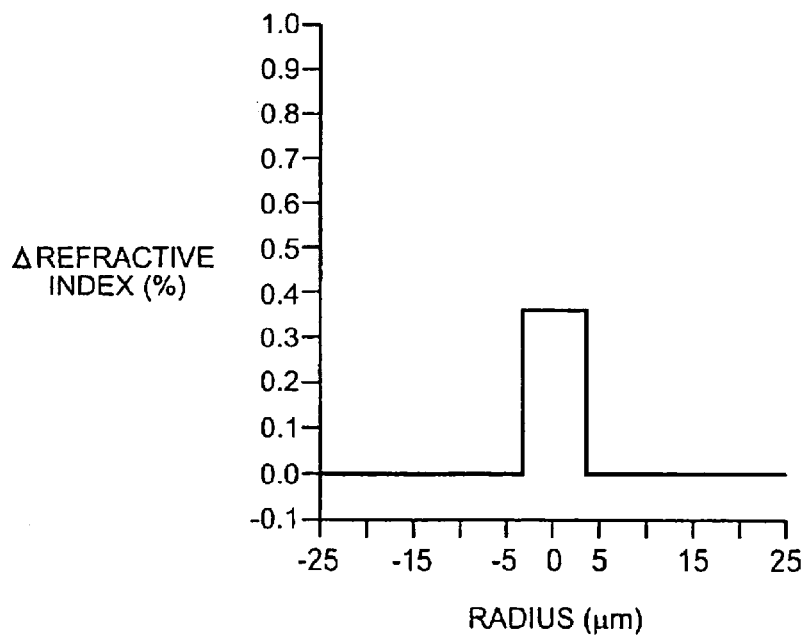
FIG. 2 illustrates a refractive index profile of a SMF in accordance with the Prior Art.

Reference will now be made in detail to the present preferred embodiments of the invention, an example of which is illustrated in the accompanying drawings. Wherever possible, the same reference numbers will be used throughout the drawings to refer to the same or like parts. Drawings should not be construed to be to scale. An exemplary embodiment of a transmission link including the DCF in accordance with the present invention is shown in FIG. 1.

Figure 3:
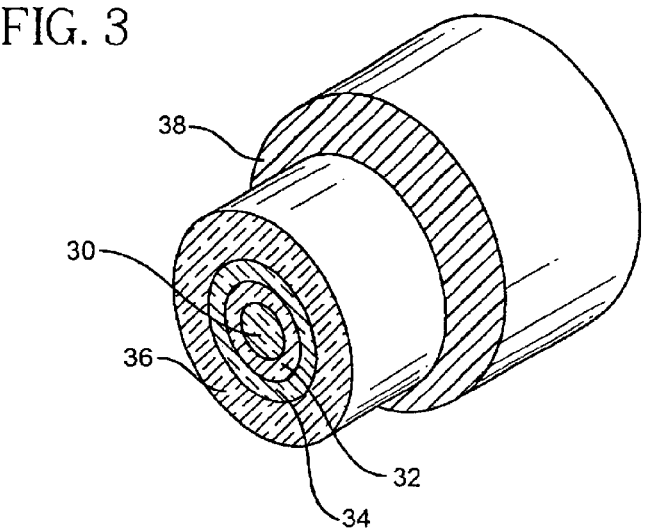
FIG. 3 illustrates a sectioned perspective view of the DCF in accordance with the invention.
Figure 4:
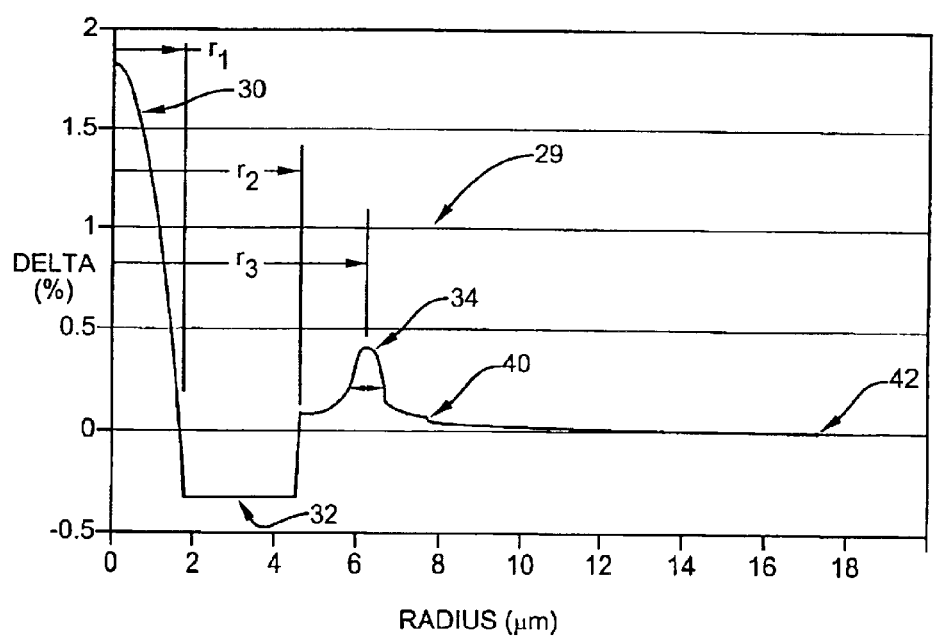
FIG. 4 illustrates a refractive index profile of a DCF in accordance with the present invention.

The transmission link 20 includes a length of SMF 22 having a positive dispersion of about 17 ps/(nm·km) at 1550 nm and positive dispersion slope of about 0.058 ps/(nm²·km) at 1550 nm. The link 20 also includes a length of DCF 24 in accordance with the invention which is a dispersion and dispersion slope compensating optical fiber having a geometry and core refractive index profile as shown in FIGS. 3 and 4, respectively. The DCF has a central cylindrical core segment 30 having a positive relative refractive index $\Delta 1$, an annular moat segment 32 surrounding and abutting the central core segment 30 that has a negative relative refractive index $\Delta 2$, and an annular ring segment 34 abutting and surrounding the moat segment 32 having a positive relative refractive index $\Delta 3$. In particular, the shape of the refractive index profile is such that $\Delta 1 > \Delta 3 > \Delta 2$ as best shown in FIG. 4.

The DCF in accordance with the present invention, has a core refractive index profile that results in a fiber exhibiting a negative dispersion slope of less than −0.29 ps/(nm²·km) at a wavelength of 1546 nm, and a negative dispersion of between −100 ps/(nm·km) and −120 ps/(nm·km) at a wavelength of 1546 nm. More preferably, the dispersion slope at 1546 nm is less than −0.29 ps/(nm²km) and greater than −0.40 ps/(nm²·km), and more preferably yet less than −0.36 ps/(nm²·km) and greater than −0.40 ps/(nm²·km) at a wavelength of 1546 nm. Most preferably, the dispersion at 1546 nm is between −105 and −120 ps/(nm·km). This DCF's attributes are ideal for compensating dispersion and dispersion slope within a transmission link including a length of SMF operating in the C-band (1520 nm to 1570 nm). Most preferably, the DCF exhibits a kappa value (κ) obtained by dividing the Dispersion (D) by the dispersion slope (DS), i.e., D/DS, at 1546 nm of between 250 and 387 nm. As can be seen in FIG. 3, the fiber also preferably includes an annular cladding layer 36 having a relative refractive index $\Delta c$ that surrounds and abuts the ring segment 34. In particular, the refractive index profile of the fiber 24 is such that $\Delta 1 > \Delta 3 > \Delta c > \Delta 2$.

Again referring to FIG. 4, the refractive index profile 29 of the DCF 24 has an up-doped central core segment 30 having peak $\Delta 1$. The core segment 30 is surrounded by a down-doped moat segment 32 having peak negative $\Delta 2$, which is in turn surrounded by an up-doped annular ring segment 34 having peak $\Delta 3$. All of the aforementioned are surrounded by the preferably pure silica cladding layer 36 and a protective polymer coating 38, such as a urethane acrylate. The coating 38 preferably includes a primary and secondary coating portions of lower and higher modulus, respectively, as is conventional. Preferably, segments 30 and 34 are formed using suitable amounts of germania-doped $SiO_2$, although other forms of index refraction increasing dopants could also be employed to achieve the fibers disclosed herein, so long as the same general refractive index profile is achieved. Likewise, whereas segment 32 is preferably formed using fluorine-doped $SiO_2$, other index of refraction decreasing dopants could be employed besides fluorine. As mentioned above, the cladding layer 36 is preferably formed of pure silica. However, the cladding region 36 may also include index of refraction increasing or decreasing in dopants, so long as the relative Δ versus radius relationship illustrated in FIG. 4 is maintained.

In one embodiment of the DCF illustrated in FIG. 4, Δ1 is greater than 1.6% and less than 2.0% and comprises an outer radius $r_1$ (in FIG. 1, $r_1$ is drawn to the point where the profile intersects the zero delta x-axis) between 1.5 and 2 microns. Δ2 is less than −0.25% and greater than −0.44%, and has an outer radius $r_2$ which ranges between 4 and 5 microns. According to the invention, Δ3 is greater than 0.3% and less than 0.5% and comprises a center radius $r_3$ (as measured from a center point of a line dissecting the half height points of the segment) of between 5.5 to 7 microns. Radius, as used herein, means the distance measured from the centerline of the optical fiber to the outer point of the segment, i.e., where the outermost region of the index segment intersects the x-axis (which is also equal to the index of the cladding layer 38). Center radius, on the other hand, is measured to the center of the core segment as determined by the half height points.

More preferably, Δ1 of segment 30 is between 1.7 and 1.9% and comprises an outer radius $r_1$ between 1.6 to 1.8 microns, Δ2 of moat segment 32 is between −0.3% and −0.37%, and has an outer radius $r_2$ between about 4.2 and 4.8 microns. The annular ring segment 34 preferably exhibits a Δ3 greater than 0.3% and less than 0.45% and a center radius of 5.2 to 5.8 microns, and a half-height width between about 0.5 to 1.5 microns, and most preferably about 1 micron.

In a preferred embodiment, Δ1 of the core segment 30 is greater than 1.6% and less than 2.0% and comprises an outer radius between about 1.5 to 2 microns, Δ2 of the moat segment 32 is less than −0.25% and greater than −0.44%, and has outer radius $r_2$ between 4 and 5 microns, and Δ3 of ring segment 34 is greater than 0.2% and less than 0.5% and comprises a center radius $r_3$ between 5.5 to 7 microns.

In a preferred embodiment, the DCF includes a ring segment 34 having a lower delta tail portion 40 that meets the zero delta % 42 at a radius greater than 8 microns, more preferably greater than 10 microns, and most preferably greater than 12 microns. The tail portion 40 preferably has a delta % of greater than 0.02% and less than 0.2% at a radius between 7 and 8 microns. Preferably, the tail portion tapers approximately linearly from about 8 microns to the zero delta % 42. The tail portion 40 improves the bend loss of the DCF.

DCFs made in accordance with the invention preferably exhibit a fiber cut off wavelength (λc) which is less than the C band (i.e. less than 1500 nm, and more preferably less than 1350 nm). Consequently, when clad with silica cladding, the fibers disclosed herein are desirably single moded at 1550 nm.

It should be noted that the fibers disclosed in here do not necessarily have to be employed only in dispersion compensating modules, and instead the fibers could be employed in dispersion compensating fiber cables (rather than enclosed modules that are typically employed in boxes).

In a preferred embodiment, the dispersion compensating optical fibers disclosed herein are deployed in such dispersion compensating modules wherein the fiber is wound around a hub. Preferably the hub is cylindrical, and has a diameter of less than about 12 inches, more preferably less than about 10 inches, and most preferably less than about 6 inches, and the length of fiber deployed therein is typically greater than 1 km. In accordance with an embodiment of the invention, when used in a transmission link, the ratio of the length of the SMF to the length of DCF is preferably greater than 6:1, more preferably greater than 7:1 and in the system shown in FIG. 1, was about 7.14:1.

EXAMPLES

The invention will be further illustrated by the following examples which are meant to be illustrative and an exemplary of the invention.

In Example 1, a fiber having the refractive index profile illustrated in FIG. 4 was made having a central core segment 30 with peak Δ1=1.84% and an outer radius $r_1$ of 1.57 microns, a lowest Δ2 in the moat segment 32 of about −0.33% and an outer radius r2 of 4.55 microns, and a ring segment peak Δ3 equal to about 0.4% with a ring center radius r3 of about 6.25 microns and a half height width of about 1 micron. The raised index regions 30 and 34 were formed using germania doping, and the lowered index region 32 was formed using fluorine doping. Outer clad region 36 is pure silica, and the outer diameter of the resultant fiber was 125 microns. The resultant fiber exhibited dispersion at 1546 nm of approximately −110 ps/nm-km, a dispersion slope of about −0.39 and a κ value of about 282 nm. The effective area of this fiber was approximately 20.2 square microns at 1546 nm, and the fiber cutoff wavelength was 1340 nm. Bend loss was 0.0035 dB/m on a 40 mm mandrel at 1550 nm and attenuation is less than 0.5 dB/km at 1550 nm.

Additional examples of embodiments in accordance with the invention are listed in Table 1. The corresponding Δ versus radius relationships of each of these examples is set forth in Table 1 below, wherein the radii of the Δ1 and Δ2 segments are outer radii, and the radius of Δ3 is a center radius. Also set forth for Δ3 is the half height width. All of the radius and half-height width values are set forth in microns. Also set forth are the corresponding dispersion properties, including dispersion measured at 1546 nm, dispersion slope at 1546 nm, kappa κ at 1546 nm, and the fiber cut off wavelength (λc).

TABLE 1

| | Δ1 | Outer $r_1$ (μm) | Δ2 | Outer $r_2$ (μm) | Δ3 | Ctr. $r_3$ (μm) | $D_{1546}$ | $D_{slope}$ | κ | Fiber cutoff |
|---|---|---|---|---|---|---|---|---|---|---|
| Ex. 1 | 1.84 | 1.57 | −.33 | 4.55 | .40 | 6.25 | −110 | −0.39 | 282 | 1340 |
| Ex. 2 | 1.83 | 1.68 | −.37 | 4.64 | .43 | 6.42 | −101 | −0.31 | 326 | 1496 |
| Ex. 3 | 1.85 | 1.64 | −.37 | 4.45 | .41 | 6.12 | −120 | −0.34 | 353 | 1445 |

As the role of waveguide dispersion is made larger in order to attain DCF's with ultra high negative dispersion slopes, the DCFs become more bend sensitive. One way to reduce the bend sensitivity of the fiber is to reduce the effective area of the fiber. This however can have negative impact on the system performance via increased non-linear effects. Hence, proper design of a DCF with high negative dispersion slope for broadband WDM systems requires a careful optimization of the bend sensitivity of the fiber while keeping the effective area of the fiber as large as possible.

The present invention has an effective area (Aeff) greater than 18 $\mu m^2$, and more preferably greater than 20 $\mu m^2$ and attenuation that is less than 0.6 dB/km. All of the results shown in Table 1 above are for fibers that were drawn to 125 micron diameter fiber.

Figure 6:
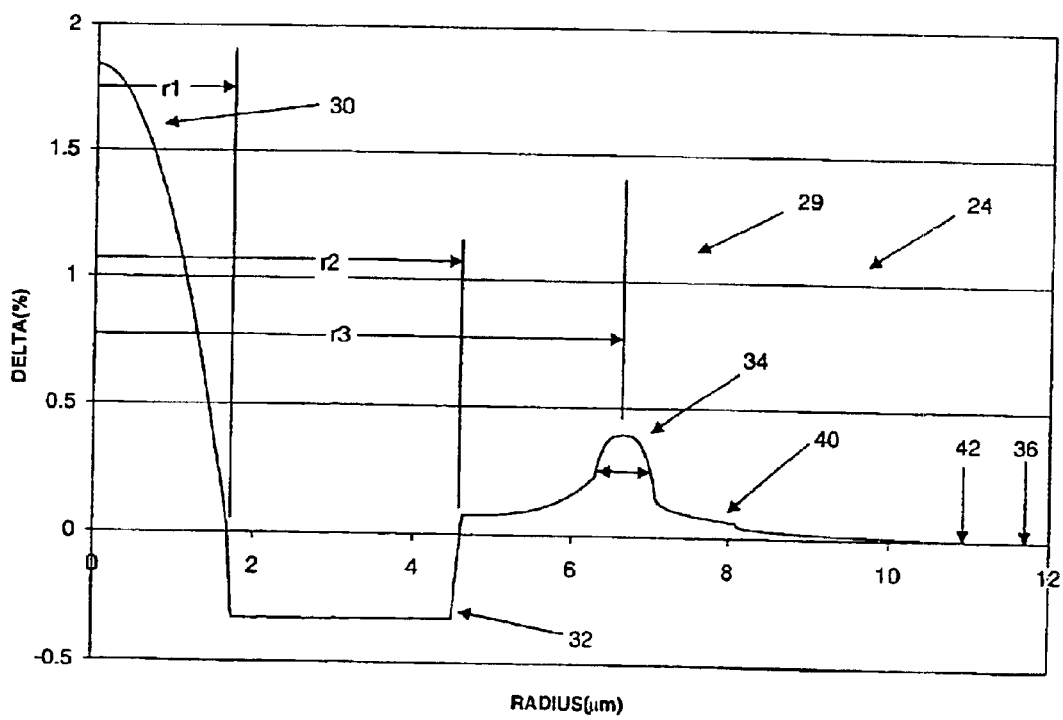
FIG. 6 illustrates a refractive index profile of another embodiment of DCF in accordance with the present invention.

Another embodiment of DC fiber in accordance with the invention is shown in FIG. 6 herein. The DCF in accordance with the present invention, has a core refractive index profile that results in a fiber exhibiting a negative dispersion slope of less than −0.29 ps/(nm²·km) at a wavelength of 1546 nm, and a negative dispersion of between −100 ps/(nm·km) and −120 ps/(nm·km) at a wavelength of 1546 nm, and a kappa value (κ) obtained by dividing the Dispersion (D) by the dispersion slope (DS), i.e., D/DS, at 1546 nm of between 250 and 387 nm. Most preferably, the dispersion at 1546 nm is between −105 and −120 ps/(nm·km). The DCF preferably exhibits a structure the same as shown in FIG. 3. In particular, the refractive index profile of the fiber 24 is such that Δ1>Δ3>Δc>Δ2. Table 2 below described the attributes and structure for the embodiment of FIG. 6 designated as Ex. 4.

The refractive index profile 29 of the DCF 24 has an up-doped central core segment 30 having peak Δ1, a down-doped moat segment 32 having peak negative Δ2, and an annular ring segment 34 having peak Δ3. The fiber 24 includes a pure silica cladding layer 36 and a conventional protective polymer coating 38. In the embodiment of the DCF illustrated in FIG. 6, Δ1 is greater than 1.6% and less than 2.0% and comprises an outer radius $r_1$ (in FIG. 6, $r_1$ is drawn to the point where the profile intersects the zero delta x-axis) of between 1.5 and 2 microns. Δ2 is less than −0.25% and greater than −0.44%, and has an outer radius $r_2$ which ranges between 4 and 5 microns. According to the invention, Δ3 is greater than 0.3% and less than 0.5% and comprises a center radius $r_3$ (as measured from a center point of a line dissecting the half height points of the segment) of between 5.5 to 7.5 microns. Radius, as used herein, means the distance measured from the fiber centerline to the outer point of the segment, i.e., where the outermost region of the index segment intersects the x-axis (which is also equal to the index of the cladding layer 36). Center radius, on the other hand, is measured to the center of the core segment as determined by the half height points.

In the embodiment of FIG. 6, the DCF includes a ring segment 34 having a lower delta tail portion 40 that meets the zero delta % 42 at a radius greater than 8 microns, more preferably greater than 10 microns. The tail portion 40 preferably has a delta % of greater than 0.02% and less than 0.2% at a radius of 8 microns. Preferably, the tail portion tapers approximately linearly from about 8 microns to the zero delta % 42.

DCFs made in accordance with the invention preferably exhibit a fiber cut off wavelength (λc) which is less than the C band (i.e. less than 1500 nm, and more preferably less than 1350 nm). Consequently, when clad with silica cladding, the fibers disclosed herein are desirably single moded at 1550 nm.

TABLE 2

|  | Δ1 | Outer $r_1$ ($\mu$m) | Δ2 | Outer $r_2$ ($\mu$m) | Δ3 | Ctr. $r_3$ ($\mu$m) | $D_{1546}$ | $D_{slope}$ | κ | Fiber cutoff |
|---|---|---|---|---|---|---|---|---|---|---|
| Ex. 4 | 1.84 | 1.69 | −.33 | 4.61 | .40 | 6.67 | −114 | −0.41 | 278 | 1460 |

The fibers described in accordance with the invention herein have excellent utility as DCFs for operation in the C-band to compensate for the dispersion and slope created in optical communications systems which employ SMF fiber optimized for zero dispersion at about 1310 nm, for example SMF-28™ manufactured by Corning Incorporated.

Consequently, in the embodiment of FIG. 1 that is optimized to enable broadband dispersion compensation for SMF across the C-band, a DCF such as Example 1 may be employed to compensate for dispersion across the C-band. Such optical communications links 20, typically consists of, for example, at least a signal component 26, such as a transmitter or amplifier and second component 28, such as a signal receiver or amplifier, and one or more amplifiers or band pass filters that optically interconnect the SMF and DCF (shown collectively as block 27) over the path of communication.

Figure 5:
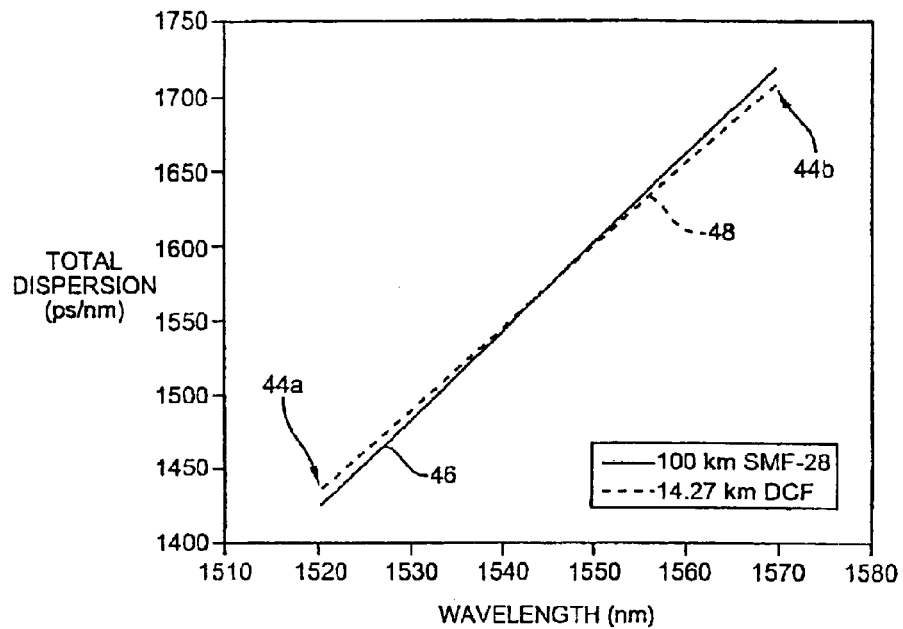
FIG. 5 is a plot illustrating residual dispersion in a transmission link including the combination of DCF and SMF in accordance with the present invention.

FIG. 5 illustrates the residual dispersion as a function of wavelength while using the DCF of example 1 in the C-band. As can be seen the absolute value of residual dispersion across the C-band is less than 0.15 ps/(nm·km). Thus for the example shown, 100 km of SMF are linked to about 14.27 km of DCF in accordance with the invention. This results in less than 15 ps/nm dispersion at the band edges 44a, 44b, as shown in FIG. 5. The plot illustrates that the DCF in accordance with the invention compensates for the dispersion of the SMF at nearly 99% over the entire C-band window. The relative parallelism of the two lines (the SMF 46 and the DCF 48) illustrate that the slope of the SMF is also very well compensated for.

The DCF in accordance with the invention is preferably manufactured utilizing standard OVD methods. The core segment 30 is formed by depositing germania-doped silica soot onto a rotating alumina mandrel. The mandrel is then removed and the soot preform is consolidated into transparent consolidated preform. The consolidated preform is then drawn in a draw furnace into core cane (slender rod) while simultaneously closing the centerline aperture under a vacuum. A segment of the core cane is placed back into a lathe and further silica soot is deposited thereon by an OVD method. The soot laden core cane is doped with fluorine in a consolidation furnace introducing $CF_4$ therein. Subsequently the fluorinated soot preform is fully consolidated thereby forming the fluorine doped region corresponding to moat segment 32. The consolidated blank is again redrawn into a core cane and additional germania-doped soot is applied by OVD thereon to form the region corresponding to the ring segment 34. The soot laden cane is again consolidated an redrawn into a core cane as before mentioned. It should be recognized that this core cane now includes regions corresponding to the core, moat and ring segments. Finally silica soot is applied onto the core cane by an OVD method and the soot laden cane is again consolidated. This forms the final consolidated preform from which fiber will be drawn. The preform is then transferred to a draw furnace where fiber is drawn therefrom using conventional techniques.

It will be apparent to those skilled in the art that various modifications and variations can be made to the present invention without departing from the spirit and scope of the invention. Thus, it is intended that the present invention covers the modifications and variations of this invention provided they come within the scope of the appended claims and their equivalents.

What is claimed is:

1. An optical fiber transmission link, comprising:
   a length of SMF optimized for low dispersion operation at a wavelength range of between 1300 nm to 1320 nm; and
   a length of DCF having a dispersion value between −100 ps/(nm·km) and −120 ps/(nm·km) at 1546 nm;
   a kappa value obtained by dividing the dispersion by a dispersion slope at 1546 nm of between 250 and 387 nm wherein within a transmission band of between 1520 nm to 1570 nm the link exhibits an absolute value of residual dispersion less than 0.15 ps/km/nm.

2. The transmission link of claim 1 wherein the length of SMF is greater than 6 times the length of the length of DCF.

3. The transmission link of claim 2 wherein the length of SMF is greater than 7 times the length of the length of DCF.

4. The transmission link of claim 1 wherein the dispersion slope is less than −0.29 ps/(nm$^2$·km) and greater than −0.40 ps/(nm$^2$·km) at a wavelength of 1546 nm.

5. The transmission link of claim 1 wherein the DCF exhibits a cutoff wavelength ($\lambda_c$) is less than 1500 nm.

6. The transmission link of claim 1 wherein the DCF has an effective area (Aeff) at 1546 nm greater than 18 square microns.

7. The transmission link of claim 1 wherein the DCF has a bend loss less than 0.01 dB/m on a 40 mm mandrel at 1550 nm.

8. The transmission link of claim 1 wherein the DCF has an attenuation less than 0.6 dB/km at 1550 nm.

9. An optical fiber transmission link, comprising:
   a length of SMF optimized for low dispersion operation at a wavelength range of between 1300 nm to 1320 nm; and
   a length of DCF having a dispersion value between −100 ps/(nm·km) and −120 ps/(nm·km) at 1546 nm;
   wherein within a transmission band of between 1520 nm to 1570 nm the link exhibits an absolute value of residual dispersion less than 0.15 ps/km/nm and
   wherein the DCF further comprises
   an outer radius $r_1$ of a central core segment between 1.5 and 2 microns;
   an outer radius $r_2$ of a moat segment is between 4 and 5 microns; and
   a center radius $r_3$ of a ring segment is between 5.5 and 7 microns.

10. The transmission link of claim 9 wherein the DCF further comprises:
    a relative refractive index $\Delta 1$ of the central core segment that is greater than 1.6% and less than 2%,
    a relative refractive index $\Delta 2$ of the moat segment that is less than −0.25% and greater than −0.44%, and
    a relative refractive index $\Delta 3$ of the ring segment that is greater than 0.2% and less than 0.5%.

* * * * *